Aug. 9, 1932.  A. B. JOHNSON  1,870,630
FEED CHAIN SPROCKET MOUNTING AND DRIVE THEREFOR
Filed Oct. 22, 1930  3 Sheets-Sheet 1
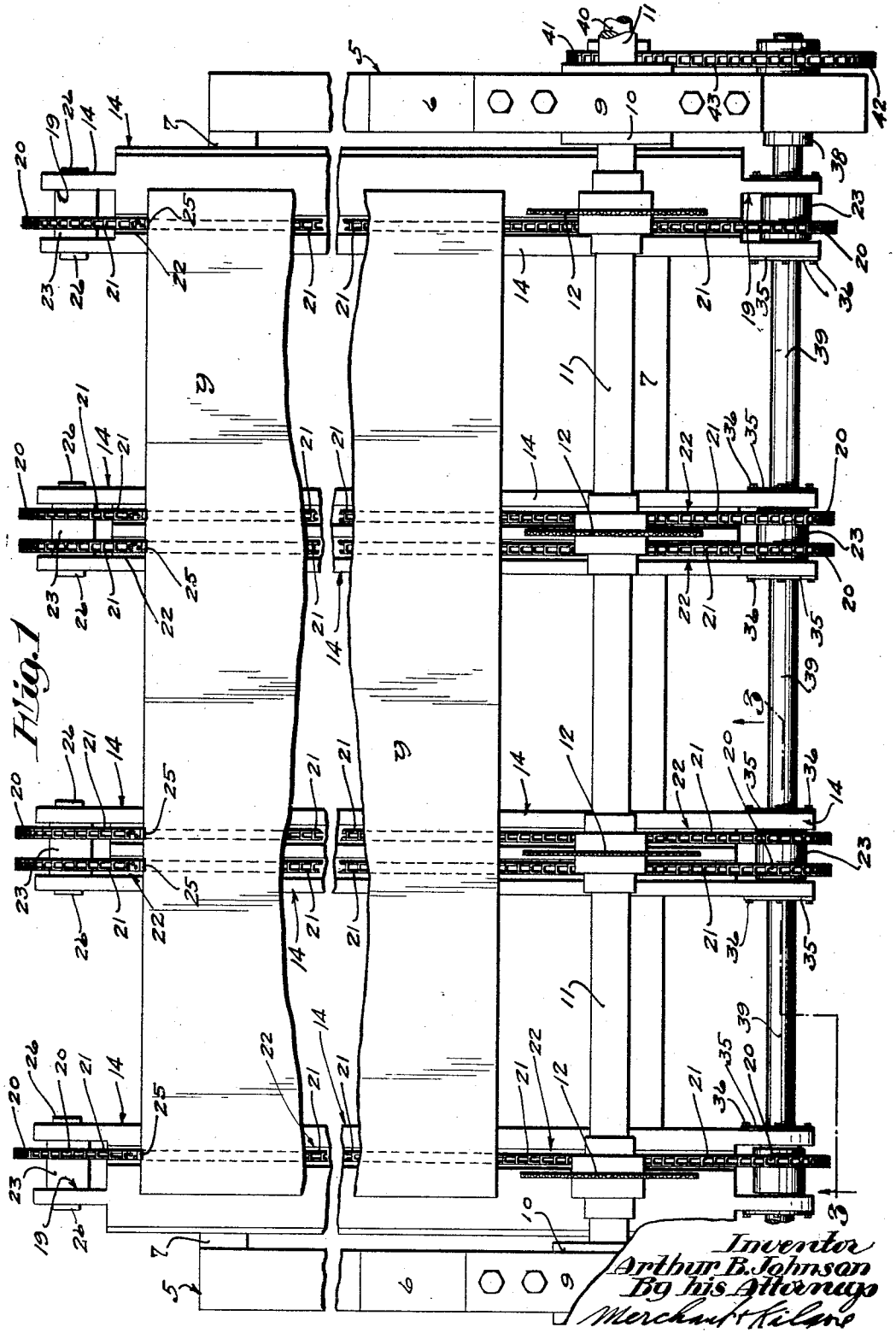

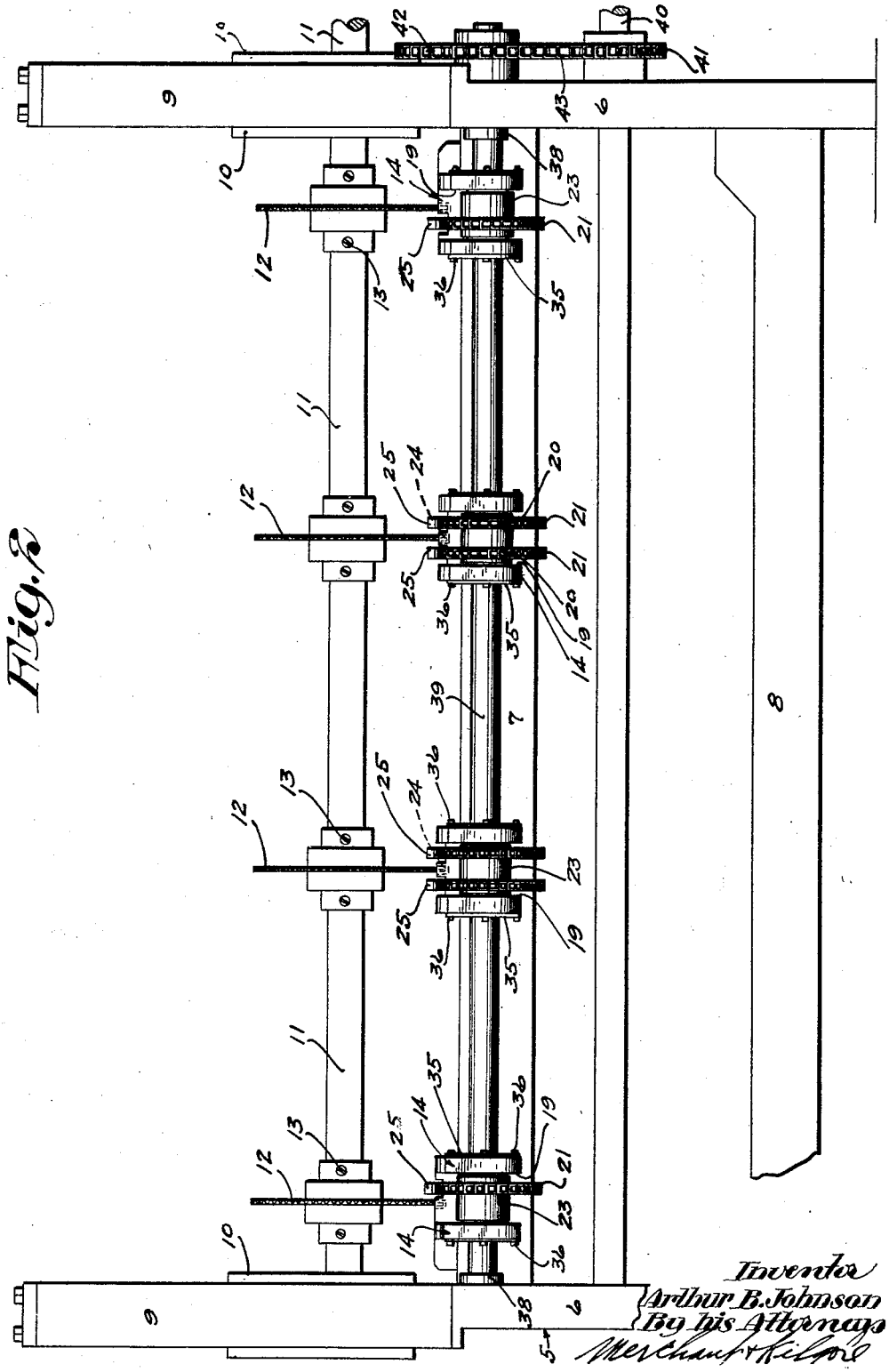

Aug. 9, 1932.                A. B. JOHNSON                1,870,630
          FEED CHAIN SPROCKET MOUNTING AND DRIVE THEREFOR
                   Filed Oct. 22, 1930        3 Sheets-Sheet 3
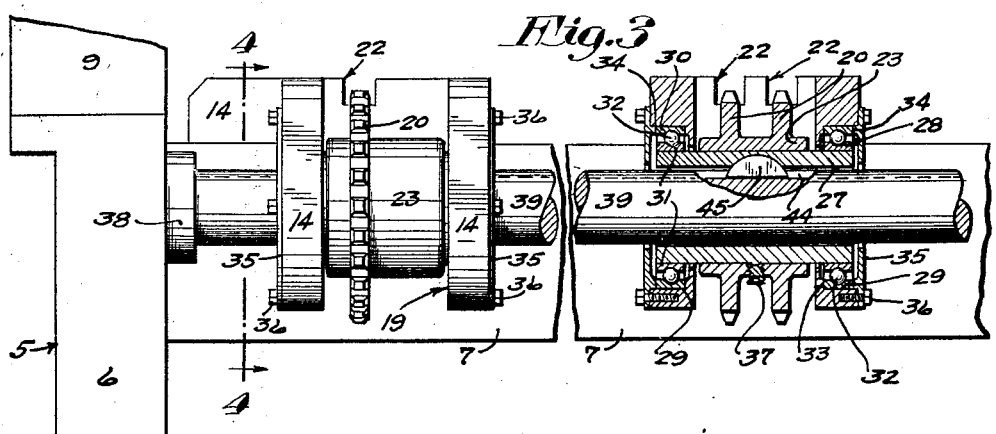
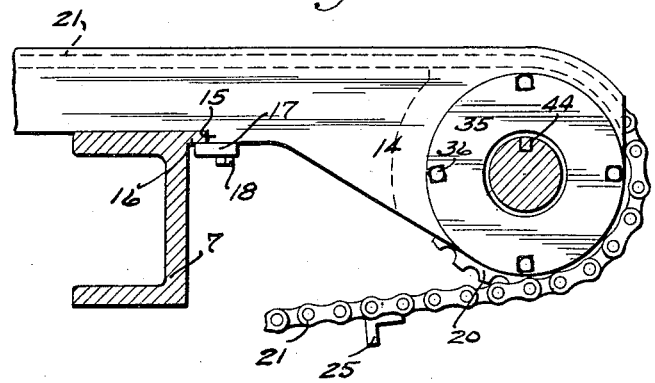
Inventor
Arthur B. Johnson
By his Attorneys Patented Aug. 9, 1932

1,870,630

UNITED STATES PATENT OFFICE

ARTHUR B. JOHNSON, OF MINNEAPOLIS, MINNESOTA

FEED CHAIN SPROCKET MOUNTING AND DRIVE THEREFOR

Application filed October 22, 1930. Serial No. 490,437.

This invention relates to novel mountings for feed chain sprockets and driving connections therebetween and a driven shaft passed substantially axially therethrough and is especially adapted for use in feed mechanisms wherein a plurality of laterally spaced feed chains are employed to engage different portions of the material, such as sheets of insulating board, wall board or the like for the purpose of imparting like feeding movements to the different portions of the material so as to feed the material in a straight line and maintain the same parallel to the chains during feeding movements.
Generally stated, the invention consists of the novel devices, combinations of devices and arrangement of parts hereinafter described and defined in the claims.

The objects and advantages of this invention will be clearly pointed out in the following specification.

In the accompanying drawings, which illustrate the invention, like characters indicate like parts throughout the several views.
Referring to the drawings:

Fig. 1 is a plan view of a sawing machine having a feed mechanism therefor which incorporates this invention, some parts being broken away;
Fig. 2 is a front or delivery end view of a machine shown in Fig. 1, some parts being broken away;

Fig. 3 is an enlarged fragmentary detail view showing some parts in full and some parts in axial section and taken on the irregular line 3—3 of Fig. 1; and Fig. 4 is a fragmentary sectional view taken on the line 4—4 of Fig. 3.

The main frame of the machine, here illustrated as an entirety by the numeral 5, comprises opposed laterally spaced side plates 6 that are connected by transverse upper and lower cross-ties 7 and 8, respectively. Extending upward from the frame side plates 6, near the front or delivery end of the machine, are saw arbor supporting brackets 9 carried by which, in opposed relation, are bearing blocks 10.

Journaled near its opposite end portions in the bearing blocks 10 and extending transversely to the machine is a suitably driven saw arbor 11 mounted on which saw arbor is a plurality of rotary disk saws 12. These saws 12 are normally maintained in driving engagement with the arbor 11 and against axial sliding movements thereon by means of set-screws or the like 13 but said saws 13 may be readily moved axially on the arbor and in respect to one another when said set-screws 13 are loosened.

Extending transversely across the upper cross-ties 7 and supported thereby is a plurality of skid rails 14 that act as supports for material such as the sheet of insulating board $y$ during the time material is being delivered to and past the saws 12. In the arrangement illustrated, the material is simply slid over the surface of the skid rails 14 when feeding movements are imparted thereto. These skid rails 14 extend longitudinally of the frame side plates 6 and at right angles to the saw arbor or shaft 11 and said rails are independently adjustable laterally on the cross-ties 7 in respect to one another.

The skids 14 rest on and are slidable over the surfaces of the upper cross-ties at the front and rear end portions of the machine but are held against forward and rearward movements in respect to the main frame by depending shoulders 15 on the front and rear end portions of the skids 14, that engage the edges of flanges 16 on the said cross-ties 7. The skid rails 14 are held normally against upward movements or lateral sliding movements over the cross-ties 7 by means of clamping lugs or the like 17 carried by the bottoms of the skid rails and arranged to be clamped against the under sides of the flanges 16 by bolts or the like 18, which bolts 18 are loosened when it is desired to laterally adjust the skid rails 14. Carried by the opposite end portions of each skid rail 14, within bifurcated end portions 19 thereof are chain sprockets 20 that are engaged in longitudinally spaced, longitudinally aligned relation so that one sprocket at each end of each skid rail 14 is aligned with a sprocket at the other end of the same rail and arranged to run over the aligned sprockets 20 are endless feed chains

21, the upper portions of which chains, intermediate the bifurcated end portions of the respective rails 14, work in longitudinal chain grooves 22 on said rails. It will here be noted by reference to the drawings that in the arrangement illustrated, there is only one sprocket at each end of each of the outer skid rails 14 and that there are two sprockets at each end of each of the intermediate rails 14 and further that the sprockets at the same ends of the intermediate rails are formed on common hubs 23. The saws 13 are adapted and arranged to extend below the surfaces of the skid rails 14 and work in slots 24 therein. These slots 24, in the outer skid rails, are located just outside of the chain groove 22 therein, which groove is aligned with the sprocket 20 carried thereby and the slots 24 in the intermediate rails are located between chain grooves therein.

The chain grooves 21, on their forward movement, work through the grooves 22 and are slid below the upper surfaces of the rails so that they do not directly engage the material y but said chains 21 carry driving lugs 25 that project above the upper surfaces of said rails in transverse alignment parallel to the saw arbor 12 and are each adapted to engage the rear end of a sheet of material y and impart like driving movements thereto to and past the saws 12, which saws cut the material into a plurality of strips of a desired width and trim the edges thereof. It is, of course, highly important, when cutting large sheets of insulating board into smaller pieces to be used in refrigerator walls or the like wherein accurate dimensions of material is necessary, to make neat, tight joints, that the driving lugs 25 be maintained at all times in true alignment and therefor in true parallel relation to the saw arbor 11. It will, of course, be readily apparent that if any one of the driving lugs were permitted to cut ahead of the others thereof, the material would be moved thereby out of true alignment with the saws 12 and arbor 11 and the sides of the finished strips would not be at a true right angle to the front and rear edges thereof, as desired. By mounting and driving the sprockets 20 in accordance with my invention, presently to be described, such inaccuracies are obviated because the lugs 25 when once aligned will remain aligned over a long period of time.

The chain sprockets 20, at the rear end of the machine, are idlers and are journaled between bifurcated rear end portions of their respective skid rails 14 on stud shafts 26 carried by said rails. The sprockets 20, at the front or delivery end of each of the rails 14, are mounted on and for movements with the sleeve 27 that is journaled near its opposite ends in the particular rail by means of anti-friction bearings 28 that are seated in cylindrical bores 29 in the rails. These anti-friction bearings 28 each comprise a fixed outer race 30, a rotary inner race 31 and an interposed ball bearing 32. The outer bearing races 30 are clamped against movement between reduced shoulders forming portions 33 of the bores 29 and annular flanges 34 carried by bearing cover plates 35 that are removably secured to the outer portions of the skids by bolts or the like 36. The sprockets 20, at the delivery or front end of the machine, are fixed against movements on the sleeves 27 by set-screws or the like 37.

Passed substantially axially through each of the sleeves 27 and journaled independent thereof near its opposite ends in the main frame 6 at 38, is a shaft 39 that is arranged to be driven from a suitably driven shaft 40 through connections comprising a sprocket 41 on the shaft 40, a sprocket 42 fast on the shaft 39 and a chain 43 running over said sprockets. This shaft 39 is smaller in diameter than the inside bore of the tubular sleeve 27 to afford clearance therebetween and the sleeves that will permit slight eccentric movements of the shaft 39 in the sleeves 27 and free axial movements of the sleeves thereon.

The sprockets 20, at the front or delivery end of the machine, are all connected to the driven shaft 39 for common rotary movements therewith irrespective of their axial positions thereon by driving connections comprising a long key-way 44 cut in the shaft 39 and extending substantially full length thereof and keys 45 carried by the sprocket sleeves 27 and arranged to work in the key-way 44. It will now be noted by reference to Fig. 3 that there is sufficient clearance between the keys 45 and the bottom of the key-way 44 to permit free eccentric movements of the driven shaft 39 within the sleeves, if such a tendency exists. In this arrangement, when the positions of the saws are changed in respect to one another to cut strips of different widths, the guide rails may be moved to a correct position in respect thereto without encountering any binding between the shaft 39 and sprockets thereon even though the shaft 39 is slightly out of alignment or slightly bent and also in spite of inaccuracies in the shaft, are aligned thereto. The several sprockets thereon will always remain in the same alignment irrespective of their positions on the shaft or eccentric movements thereof within the sleeves 27. By thus driving the sprockets in common and maintaining the same against movements in respect to one another, the drive lugs, carried by the chains 21 that run thereover, will remain in a pre-set alignment so that they will at all times impart like feeding movements to the material which will result in accurate cutting.

What I claim is:

1. In a feed mechanism a plurality of spaced rotating feed members, a drive shaft substantially concentric to but loose in the said feed members, means for journalling and maintaining the feed members in accurate axial alignment independently of the drive shaft, and driving connections between the drive shaft and feed members for imparting like rotary motion thereto but permitting eccentric motion of the shaft in respect to the feed members.

2. A feed mechanism comprising a plurality of spared rotary feed members, laterally spaced endless feeding devices arranged to run over and be positively driven one by each of the said rotary feed members, a drive shaft passed substantially concentrically through but loose in the said rotary feeding members, means for journalling and maintaining the rotary feed members in true axial alignment independently of the drive shaft, and driving connections between the drive shaft and rotary feed members operative to impart like rotary motion thereto but to permit eccentric motion of the shaft in respect to the feed members.

3. In a feed mechanism, spaced parallel rails for supporting material being fed, a plurality of rotary feed members journalled one in each of said rails for true rotary movements in respect thereto and in axial alignment with one another, a drive shaft passed substantially concentrically through but loose in and journalled independently of said rotary feeding members, means supporting the said rails independently of the drive shaft and guiding the same for true lateral adjusting movements that will maintain the rotary feeding members in true axial alignment independent of the drive shaft, endless feeding devices running over the rotary feed members and their respective rails for feeding material over said rails, and driving connections between the shaft and rotary feeding members operative to impart like rotary movements thereto and permitting eccentric movements of the shaft therein and axial movements of said feeding members thereon.

In testimony whereof I affix my signature.

ARTHUR B. JOHNSON.